United States Patent
Kobayashi

(10) Patent No.: US 7,106,386 B2
(45) Date of Patent: Sep. 12, 2006

(54) DEVICE AND METHOD FOR IMPROVING PICTURE QUALITY

(75) Inventor: Michio Kobayashi, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 418 days.

(21) Appl. No.: 10/198,348

(22) Filed: Jul. 19, 2002

(65) Prior Publication Data

US 2003/0020836 A1    Jan. 30, 2003

(30) Foreign Application Priority Data

Jul. 30, 2001   (JP) ............................ 2001-229406

(51) Int. Cl.
*H04N 5/21* (2006.01)
*H04N 1/409* (2006.01)
*H04N 1/58* (2006.01)

(52) U.S. Cl. ................ 348/625; 348/627; 348/688; 348/683; 382/264; 382/266; 358/3.27

(58) Field of Classification Search ............. 348/625, 348/627, 607, 606, 628, 629, 630, 635, 683, 348/688, 252, 255; 382/261, 263, 264, 266, 382/269, 274, 275; 358/447, 532, 3.27, 3.26, 358/520

See application file for complete search history.

(56) References Cited

U.S. PATENT DOCUMENTS

| | | | |
|---|---|---|---|
| 4,302,777 A | | 11/1981 | Kemmer et al. |
| 4,454,533 A | * | 6/1984 | Lagoni ................. 348/627 |
| 6,043,853 A | * | 3/2000 | Shimazaki et al. ......... 348/625 |
| 6,774,937 B1 | * | 8/2004 | Kobayashi .............. 348/222.1 |
| 6,850,275 B1 | * | 2/2005 | Minakami ............... 348/252 |
| 2004/0061790 A1 | * | 4/2004 | Tanji et al. |

FOREIGN PATENT DOCUMENTS

| | | |
|---|---|---|
| EP | 0 507 593 A2 | 10/1992 |
| GB | 2 325 585 A | 11/1998 |
| GB | 2 352 352 A | 1/2001 |
| JP | S58-85673 A | 5/1983 |
| JP | 61-270987 A | 12/1986 |
| JP | 61-270993 A | 12/1986 |
| JP | 61-270994 A | 12/1986 |
| JP | 61-295786 A | 12/1986 |
| JP | H03-40668 A | 2/1991 |
| JP | H03-289877 A | 12/1991 |
| JP | H05-122577 A | 5/1993 |
| JP | H05-252421 A | 9/1993 |
| JP | H06-319129 A | 11/1994 |
| JP | H06-319152 A | 11/1994 |
| JP | H07-184084 A | 7/1995 |
| JP | H11-168737 A | 6/1999 |
| JP | 2000-224473 A | 8/2000 |

\* cited by examiner

*Primary Examiner*—David Ometz
*Assistant Examiner*—Jean W. Désir
(74) *Attorney, Agent, or Firm*—Sughrue Mion, PLLC

(57) ABSTRACT

A picture quality improvement device has two-dimensional low-pass filter that takes as input a luminance signal YIN that is obtained from a video signal and that extracts low-pass components for a vertical direction and a horizontal direction of the input luminance signal YIN. The picture quality improvement device adds an edge signal, which is obtained by subtracting from luminance signal YIN the low-pass extraction signal (LPF) that has been extracted by two-dimensional low-pass filter, to luminance signal YIN. Two-dimensional low-pass filter is constituted such that the extraction gain of the vertical direction low-pass component and the extraction gain of the horizontal direction low-pass component are independently adjusted.

14 Claims, 14 Drawing Sheets

FIG. 5
PRIOR ART
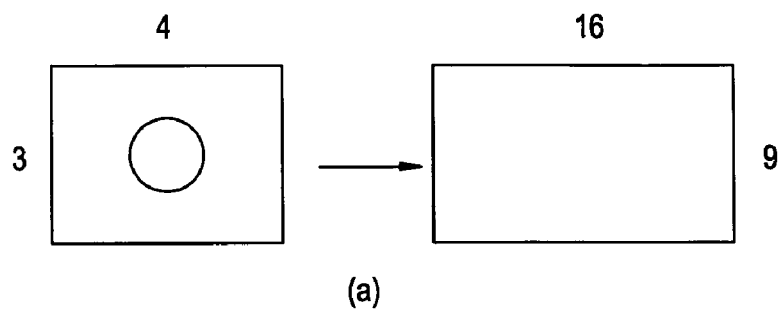
(a)
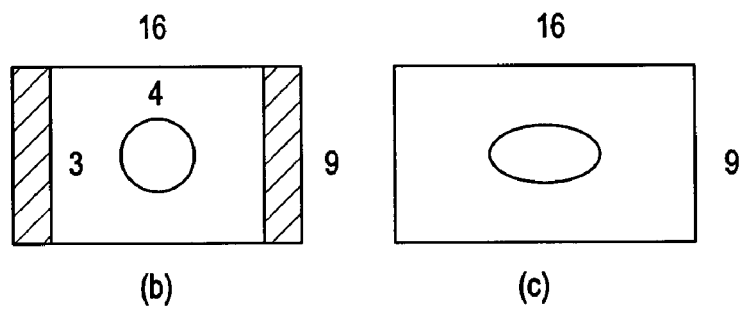
(b) (c)
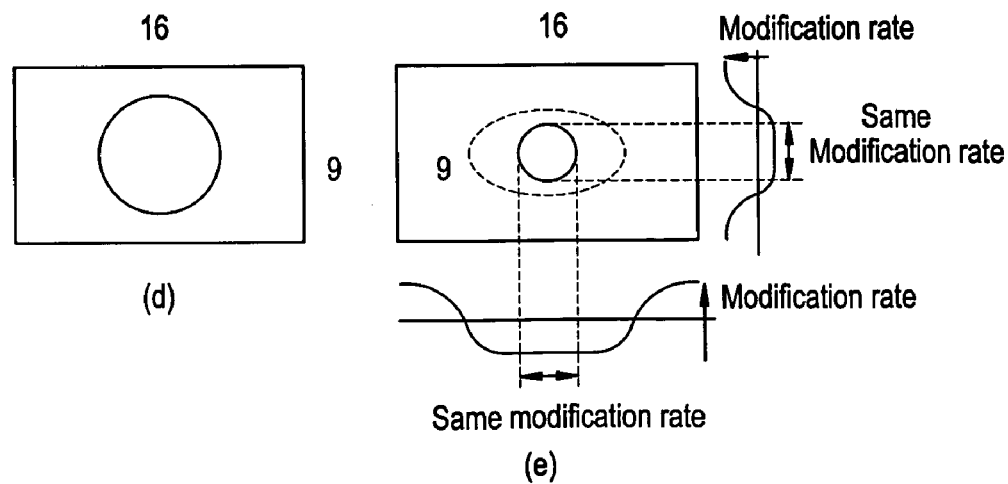
(d) (e)

Output of vertical gain adjustment circuit ($\alpha = 1$)

DEVICE AND METHOD FOR IMPROVING PICTURE QUALITY

BACKGROUND OF THE INVENTION

1. Field of the Invention

The present invention relates to a device and method of improving picture quality of a television set or video projector.

2. Description of the Related Art

The occurrence of flare is known as a cause for degradation of picture quality in an image display device such as a television set or video projector. Flare is a phenomenon in which light in bright areas infiltrates dark areas due to reflection or scattering of light on the lens or projection surface of a picture tube or projector, thereby causing fading at edges (for example, at the border between a white area and a dark area) in a displayed image in which the difference in luminance is great.

The prior art is described based on the description in the specification of Japanese Patent Application No. 2001-086516, which is in an invention that is related to the present invention.

FIG. 1 is a schematic figure showing an example of the original image of an image that is projected by a projector. This original image has a rectangular white area WT in the center that is surrounded by a black area BL, the edge portion ED at the boundary of these two areas having a large difference in luminance. The lower portion of FIG. 1 shows the horizontal video signal (luminance signal) in the vicinity of the center of the original image. When this original image is projected onto a screen by a projector, light of the white area WT infiltrates the black area BL and degrades the edge portion ED, thereby giving rise to flare and reducing the picture quality.

To eliminate the above-described flare, the video signal that is applied as input to the projector is typically subjected to digital signal processing to correct degradation of the edge portions. FIG. 2 is a schematic figure of flare correction, (a) showing waveform chart showing the video signal of the original image, (b) showing the luminance distribution of the screen image that is displayed by means of the video signal of (a), (c) showing a waveform chart of the signal after flare correction of the video signal of (a), and (d) showing the luminance distribution of the screen image that is displayed by means of the video signal after flare correction of (c). Here, the video signal of FIG. 2(a) corresponds to the video signal of the original image that is shown in the above-described FIG. 1.

The screen image that is obtained by using a projector to project the video signal of FIG. 2(a) is an image having edge portions as shown in FIG. 2(b) that have been blunted by the occurrence of flare. To correct this flare, correction (reverse correction) as shown in FIG. 2(c) that corresponds to the blunting of the edge portions shown in FIG. 2(b), i.e., correction that sharpens the edges, should be applied at the rises and falls in the video signal of FIG. 2(a). This correction allows a screen image to be obtained that has no blunting of the edge portions, such as shown in FIG. 2(d).

FIG. 3 shows an example of a picture quality improvement device that performs the above-described flare correction. Of a luminance signal and a color signal (broadband color signal and narrowband color signal) obtained from the primary color signals R-G-B, the picture quality improvement device generates a correction signal for correcting flare from the luminance signal and adds this flare correction signal to the original luminance signal to correct flare. This picture quality improvement device is made up by: vertical low-pass filter (VLPF) 71, horizontal low-pass filter (HLPF) 72, delay circuit 73, subtracter 74, gain adjustment circuit 75, and adder 76.

VLPF 71 takes as input luminance signal $Y_{IN}$ that is obtained from primary color signals R-G-B, and has the two outputs "Main out," for outputting the received luminance signal $Y_{IN}$ without modification, and "LPF out" for outputting the vertical low-pass component of the received luminance signal $Y_{IN}$ that has been extracted. "Main out" is supplied to delay circuit 73, and "LPF out" is supplied to HLPF 72.

Delay circuit 73 applies a time delay that exactly corresponds to the time required for filtering the received signal in VLPF 71 and HLPF 72, and the output of delay circuit 73 is applied to each of the "+" input of subtracter 74, and one of the inputs of gain adjustment circuit 75 and adder 76.

HLPF 72 extracts the horizontal low-pass component from the signal of "LPF out" of VLPF 71, i.e., the signal in which the vertical low pass component of luminance signal YIN has been extracted. VLPF 71 and HLPF 72 together constitute a two-dimensional low-pass filter for flare correction. The output of HLPF 72 (low-pass extraction signal) is supplied to the "−" input of subtracter 74. VLPF 71 and HLPF 72 are both constituted by a FIR (Finite Impulse Response) filter or an IIR (Infinite Impulse Response) filter that is composed of a plurality of registers. For example, VLPF 71 or HLPF 72 may be constituted by the combination of a 12-Tap FIR filter and a 1-Tap IRR filter.

Subtracter 74 subtracts the low-pass extraction signal (the output of a two-dimensional low-pass filter) that is supplied to the "−" input from HLPF 72 from the luminance signal (this being the original luminance signal) that is supplied to the "+" input from delay circuit 73 and supplies the edge signal, which is the subtraction result, to gain adjustment circuit 75.

Gain adjustment circuit 75 prevents a decrease in the sensitivity of the flare correction filter (in this case, a two-dimensional low-pass filter composed of VLPF 71 and HLPF 72) in dark portions of an image in which the signal level is low when a nonlinear signal that is multiplied by gamma is taken as the input signal. Normally, a gamma-multiplied nonlinear signal is taken as the input signal in an image display device such as a television set or projector in consideration of the characteristics of the construction (for example, the characteristic of the cathode ray tube). When such a signal is subjected to filter processing to produce a correction signal (flare correction signal) and added, the linearity of the correction signal itself is lost, the sensitivity of the correction filter falls in dark areas of an image in which the signal level is low, and sufficient improvement in the picture quality is not obtained in dark areas. To prevent this state, the gain in correction signal that is produced by the flare correction filter is regulated by gain adjustment circuit 75. The output of this gain adjustment circuit 75, i.e., an edge signal that is corrected such that the gamma characteristic is linear, is supplied to the other input of adder 76.

Adder 76 adds the edge signal that has been subjected to gain regulation by gain adjustment circuit 75 to the luminance signal (original luminance signal) that is supplied from delay circuit 73 and outputs luminance signal Yout, which is the result of this addition.

In a picture quality improvement device that is constructed according to the foregoing explanation, luminance signal $Y_{IN}$ is applied as input to VLPF 71 where the vertical low-pass component is extracted, then applied as input to HLPF 72, where the horizontal low-pass component extracted. At the same time, luminance signal $Y_{IN}$ is supplied to delay circuit 73 by way of VLPF 71 and subjected to a prescribed delay by this delay circuit 73.

A low-pass extraction signal in which the low-pass components in each of the vertical and horizontal directions have been extracted by VLPF 71 and HLPF 72 is supplied to the "−" input of subtracter 74, and the original luminance signal that has undergone a prescribed delay by delay circuit 73 is simultaneously supplied to the "+" input of subtracter 74. In subtracter 74, the low-pass extraction signal that is supplied to the "−" input is subtracted from the original luminance signal that is supplied to the "+" input to obtain an edge signal.

FIG. 4(*a*) is a waveform chart of the edge signal, and FIG. 4(*b*) is a waveform chart of the original video signal. The edge signal that is shown in FIG. 4(*a*) is equivalent to edge portions ED relating to the horizontal direction of the original image that is shown in the previously described FIG. 1; the original video signal shown in FIG. 4(*b*) is equivalent to a video signal of the original image shown in FIG. 1; and adding this edge signal and original video signal can obtain a signal waveform following flare correction that was shown in the previously described FIG. 2(*c*). In the present form, subtracting the low-pass extraction signal in which the low-pass components in the vertical and horizontal directions have been extracted by means of VLPF 71 and HLPF 72 from the original luminance signal that has undergone a prescribed delay by means of delay circuit 73 obtains the edge signal that is shown in FIG. 4(*a*).

After undergoing correction by means of gain adjustment circuit 75 such that the gamma characteristic becomes linear, the edge signal that is outputted from subtracter 74 is added by means of adder 76 to the original luminance signal that has been supplied from delay circuit 73, whereby the signal waveform after flare correction that is shown in the previously described FIG. 2(*c*) is obtained. The output of this adder 76, which is luminance signal Yout, and a color signal (broadband color signal and narrowband color signal), which is obtained from the primary color signals R-G-B, are applied as input to a known matrix circuit (not shown in the figure) to reconvert to an R signal, a G signal, and a B signal, which are the primary color signals. An image is displayed based on the R signal, G signal, and B signal that have been reconverted in this way.

To apply the picture quality improvement device that is constituted as described hereinabove to wide-screen (the aspect ratio of the screen being 16:9), the following process is carried out. A number of display modes exist for applying an image in which the screen aspect ratio is 4:3 to a wide screen in which the aspect ratio is 16:9. FIG. 5 is a figure for illustrating display modes when dealing with a wide screen, (a) showing display on a wide-screen of an original image in which the screen has an aspect ratio of 4:3, (b) showing the display in normal display mode, (c) showing display in full display mode, (d) showing display in zoom display mode, and (e) showing display in nonlinear display mode.

As shown in FIG. 5, when an image in which a circle is drawn in the center for a screen having an aspect ratio of 4:3 is displayed on a wide screen in which the screen has an aspect ratio of 16:9, four display modes exist: normal display mode, full display mode, zoom display mode, and nonlinear display mode.

In normal display mode, the original image of FIG. 5(*a*) is displayed without alteration in the center of the screen as shown in FIG. 5(*b*) (this display area being the effective area) and both sides are black areas. In full display mode, an image is displayed in which the original image of FIG. 5(*a*) is enlarged horizontally at a prescribed magnification as shown in FIG. 5(*c*). In zoom display mode, an image is displayed in which the original image of FIG. 5(*a*) is enlarged both vertically and horizontally at the same magnification as shown in FIG. 5(*d*). In nonlinear display mode, an image is displayed in which the original image of FIG. 5(*a*) has been subjected to nonlinear image processing in which proportions are equal to the original image within a prescribed region in the center but in which magnification increases with greater distance from the center.

When dealing with a wide screen, display is normally set to any one of the above-described display modes, but a device having the above-described construction entails the following processing when setting to display modes.

(1) Normal Display Mode

When set to normal display mode, an image having black areas on both sides is processed as the original image (an original image having an aspect ratio of 4:3 originally has black areas (blanking areas) above and below and to the left and right of the image), for example, as shown in FIG. 5(*b*). The device shown in FIG. 3 is constituted for detecting edges, and the edges at the boundaries of the black areas and the effective area therefore rise when processing such an original image, these edges thereby constituting a cause of degradation of picture quality. To prevent this degradation, the following process is carried out.

FIG. 6 is a waveform chart showing horizontal video signal in the normal display mode, a1 being the black area (blanking area) to the left of the image, b being the effective area, and a2 being the black area (blanking area) to the right of the image. In HLPF 72 of the circuit that was previously described in FIG. 3, values Ps of the start of the image are set in all registers at the start timing of effective area b, the values of the registers are shifted to update the image during the interval of effective area b, and the end values Pe are set (held) in the registers without updating the image in black area a2.

Blanking areas normally exist in the upper and lower directions of the screen, and a process that is similar to the above-described processing in HLPF 72 is therefore also performed in VLPF 71.

(2) Full Display Mode

When set to full display mode, correcting flare by means of the circuit shown in FIG. 3 and then extending the original image horizontally at a prescribed magnification means that the correction values themselves are also extended, whereby a sufficient correction effect, which is the object, cannot be obtained. In such a case, the response characteristic of HLPF 72 must be altered (shortened) in accordance with the magnification at which the image is extended. Specifically, the impulse response of HLPF 72 (the filter coefficient) is set such that the edge width of the edge signal, which is the output of subtracter 74, is reduced to the degree that the image is extended.

(3) Zoom Display Mode

When set to zoom display mode, the effect upon correction of extension of an image when in the above-described full display mode also occurs in the vertical direction. In this case, the response characteristic of VLPF 71 and HLPF 72 must be changed (made shorter) according to the magnification of extension of the image. Specifically, the impulse responses (filter coefficients) of VLPF 71 and HLPF 72 are set such that the edge width of the edge signal, which is the output of subtracter 74, is reduced to the degree that the image is extended.

(4) Nonlinear Display Mode

When set to nonlinear display mode, correction is carried out by means of the circuit shown in FIG. 3, following which the original image is subjected to nonlinear extension, whereby the correction value itself undergoes extension and the object correction effect cannot be obtained. In this case, a process for applying nonlinear enlargement to the original image must be performed before the correction by the circuit shown in FIG. 3. In this case, the nonlinear processing circuit for realizing the nonlinear display mode may be provided on the input side of the circuit shown in FIG. 3.

When an image that is displayed by means of video signals is applied to a wide screen by enlarging at a prescribed magnification in the horizontal direction, the vertical direction, or both directions, the amount of amplitude (the size of "a" in FIG. 4) of the edge signal shown in FIG. 4(a) must be adjusted according to the enlargement magnification. In order to realize this adjustment of the amount of amplitude of the edge signal in the picture quality improvement device of the prior art, the vertical low-pass filter and horizontal low-pass filter are configured such that the response characteristics of each are shorter, to a degree that is equal to the above-described prescribed magnification, than the target response characteristic when there is no enlargement of the image. Specifically, the set values of the impulse response (filter coefficients) of the vertical low-pass filter and horizontal low-pass filter are modified. Normally, to realize a filter in which the filter coefficient can be modified, a multiplier is required in the coefficient unit that constitutes the filter, whereby the filter circuit configuration inevitably becomes large. Consequently, there is the problem that a picture quality improvement device of the prior art entails large circuit scale because it requires low-pass filters in which filter coefficients can be freely set.

SUMMARY OF THE INVENTION

It is an object of the present invention to provide a device for improving picture quality that can solve the above-described problems at low cost and with a small circuit scale.

It is another object of the present invention to provide a method for improving picture quality that can realize such a device.

To achieve the above-described objects, the picture quality improvement device of the present invention has a two-dimensional low-pass filter for taking as input a luminance signal that is obtained from a video signal and extracting low-pass components of the input luminance signal for the vertical direction and horizontal direction of an image that is displayed by the video signal:

wherein an edge signal, which is obtained by subtracting, from the luminance signal, a low-pass extraction signal that has been extracted by means of the two-dimensional low-pass filter, is added to the luminance signal; and wherein the two-dimensional low-pass filter is constituted such that the extracted gain of the low-pass component of the vertical direction and the extracted gain of the low-pass component of the horizontal direction are independently adjusted.

The method of improving picture quality of the present invention includes:

a first step for extracting the low-pass component for each of the vertical direction and horizontal direction of an image that is displayed by means of the video signal of a luminance signal that is obtained from a video signal; and a second step for obtaining an edge signal by subtracting from the luminance signal the low-pass extraction signals that were extracted in the first step and adding the obtained edge signal to the luminance signal;

wherein the extraction gain of the low-pass component in the vertical direction and the extraction gain of the low-pass component in the horizontal direction in the first step are each independently adjusted.

In the present invention as described hereinabove, the independent adjustment of the extraction gain of the low-pass component of the vertical direction and the extraction gain of the low-pass component of the horizontal direction enables the adjustment of the amount of amplitude (the size of "a" in FIG. 4) of the edge signal shown in FIG. 4(a) for each of the vertical direction and horizontal direction when applied to a wide screen. By means of this constitution, there is no need to modify the set values of the impulse responses (filter coefficients) of a vertical low-pass filter and horizontal low-pass filter as is required in the prior art. As a result, there is no need to use, as the vertical low-pass filter and horizontal low-pass filter, filters that allow modification of the filter coefficient.

According to the present invention, filters in which the response characteristics are fixed can be used as the vertical low-pass filter and horizontal low-pass filter, whereby a device can be provided that has lower cost and smaller circuit scale than the prior art.

The above and other objects, features, and advantages of the present invention will become apparent from the following description with reference to the accompanying drawings, which illustrate examples of the present invention.

BRIEF DESCRIPTION OF THE DRAWINGS

FIG. 5 is a figure for explaining display modes when displaying on a wide screen, (a) showing the display of an original image of a screen having an aspect ratio of 4:3 on a wide screen; (b) showing display of normal display mode; (c) showing display of full display mode; (d) showing display of zoom display mode; and (e) showing display of nonlinear display mode.

DETAILED DESCRIPTION OF THE PREFERRED EMBODIMENTS

Embodiments of the present invention are next described with reference to the accompanying figures.

Figure 7:
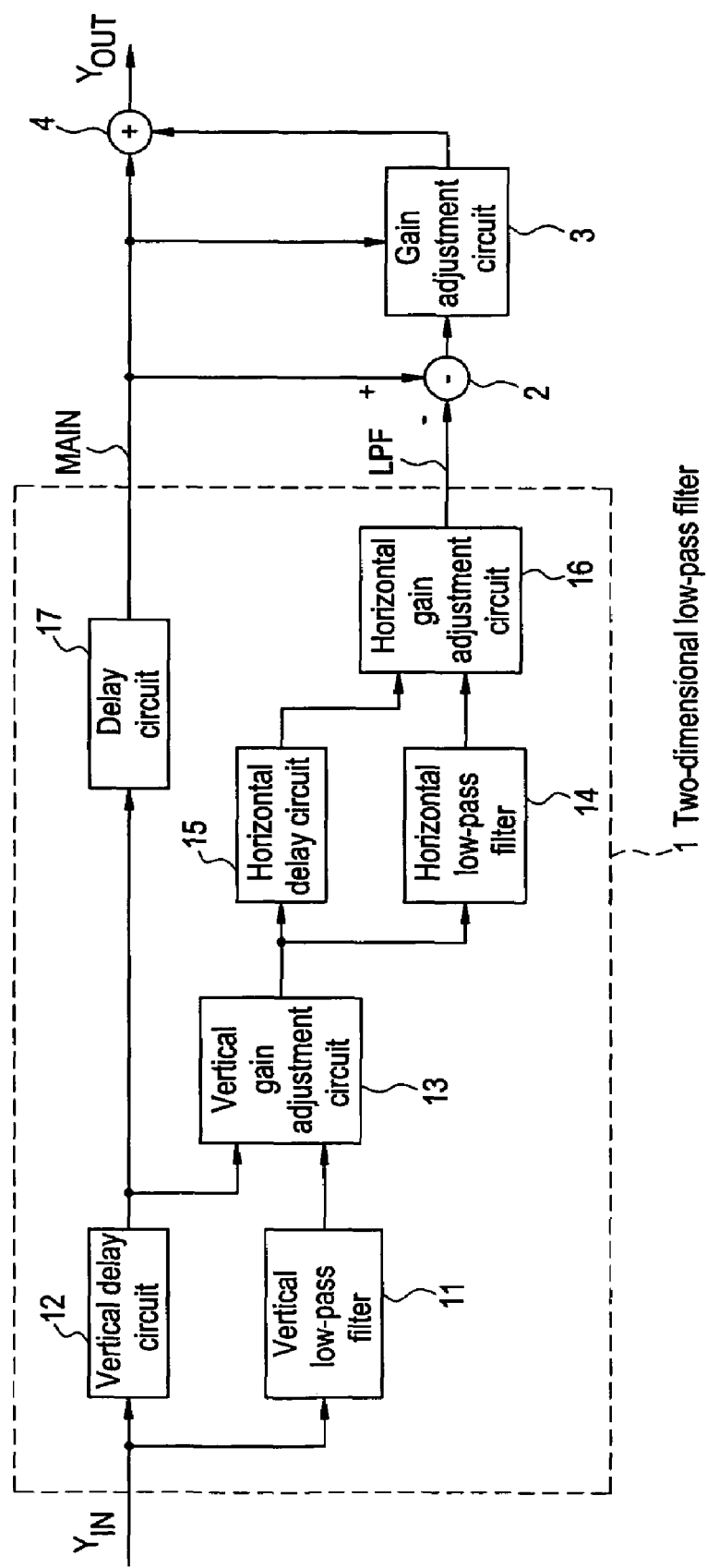
FIG. 7 is a block diagram showing the overall constitution of the picture quality improvement device of an embodiment of the present invention.

We refer first to FIG. 7, in which is shown a block diagram showing the overall construction of the picture quality improvement device of an embodiment of the present invention. The picture quality improvement device of this embodiment: generates a correction signal for correcting flare from, of the luminance signal obtained from primary color signals R-G-B and color signals, the luminance signal; and adds the flare correction signal to the original luminance signal to correct flare. The picture quality improvement device of this embodiment is composed of two dimensional low-pass filter 1, subtracter 2, gain adjustment circuit 3, and adder 4.

Two-dimensional low-pass filter 1 takes as input a luminance signal YIN that is obtained from the primary color signals R-G-B, and extracts two-dimensional low-pass components of the vertical and horizontal directions of the received luminance signal YIN. This two-dimensional low-pass filter 1 outputs both the extracted low-pass components that are outputted as signal LPF and signal MAIN, which has been delayed a time interval corresponding to the time required for the filter processing of the received luminance signal YIN. Signal LPF is supplied to the "−" input of subtracter 2, and signal MAIN is applied to the "+" input of subtracter 2 and to one input of each of gain adjustment circuit 5 and adder 4.

Subtracter 2 subtracts signal LPF (low-pass extraction signal), which has been supplied to the "−" input from two-dimensional low-pass filter 1, from signal MAIN (this being taken as the original luminance signal) that has been supplied to the "+" input and supplies the subtraction result, which is the edge signal, to gain adjustment circuit 3.

Figure 3:
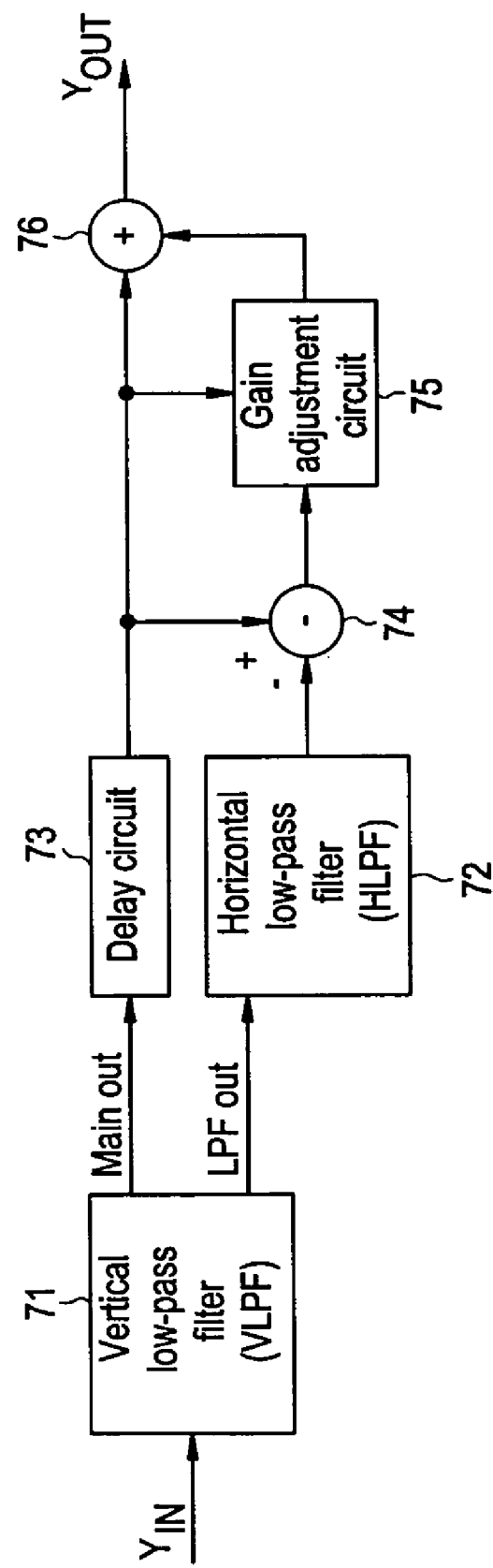
FIG. 3 is a block diagram showing the overall constitution of a picture quality improvement device of the prior art.

As with the previously described gain adjustment circuit of FIG. 3, gain adjustment circuit 3 prevents decrease in the sensitivity of the flare correction filter (two-dimensional low-pass filter) in dark image portions in which signal level is low when a gamma-multiplied nonlinear signal is taken as the input signal. The output of this gain adjustment circuit 3, i.e., an edge signal that has been corrected such that the gamma characteristic is linear, is supplied to the other input of adder 4.

Adder 4 adds the edge signal that has undergone gain adjustment by gain adjustment circuit 3 to signal MAIN (the original luminance signal) that has been supplied from two-dimensional low-pass filter 1 and outputs luminance signal YOUT, which is the result of addition.

In a picture quality improvement device that is constituted as described in the foregoing explanation, at the same time that two-dimensional low-pass components in the vertical and horizontal directions are extracted from luminance signal YIN by means of two-dimensional low-pass filter 1 and supplied to the "−" input of subtracter 2, signal MAIN that is delayed by exactly the time interval required for filter processing in the received luminance signal YIN is supplied to the "+" input of subtracter 2. Subtracter 2 subtracts the low-pass extraction signal LPF that has been supplied to the "−" input from the original luminance signal that has been supplied to the "+" input to obtain an edge signal, as in the previously described picture quality improvement device of the prior art.

Figure 1:
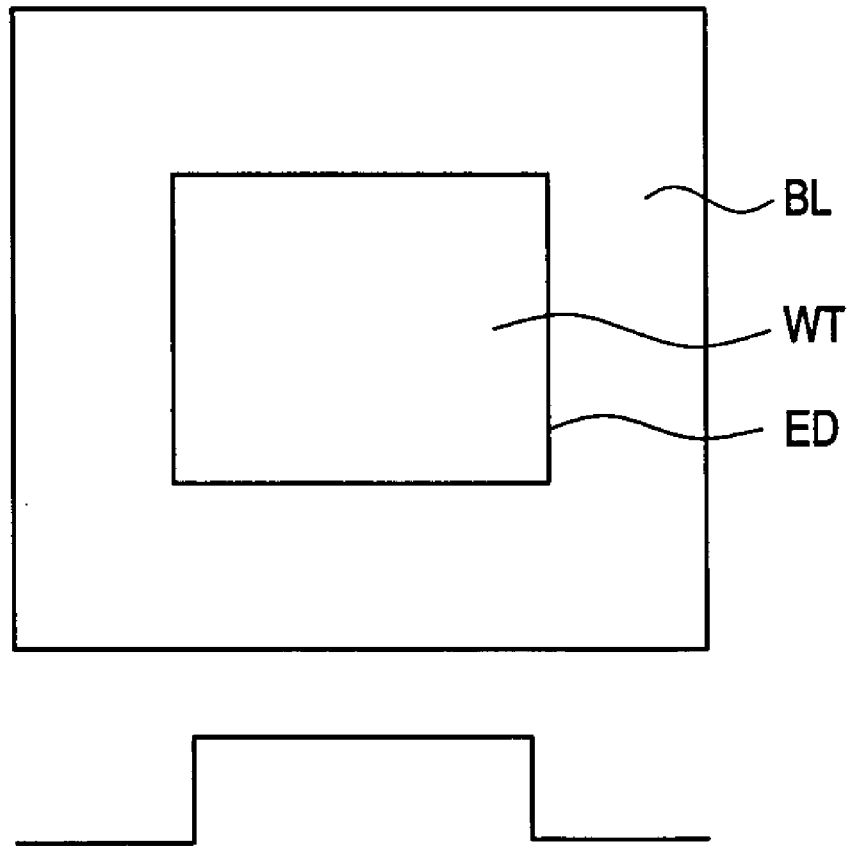
FIG. 1 is a schematic representation showing one example of an original image of an image that is projected by means of a projector.
Figure 2:
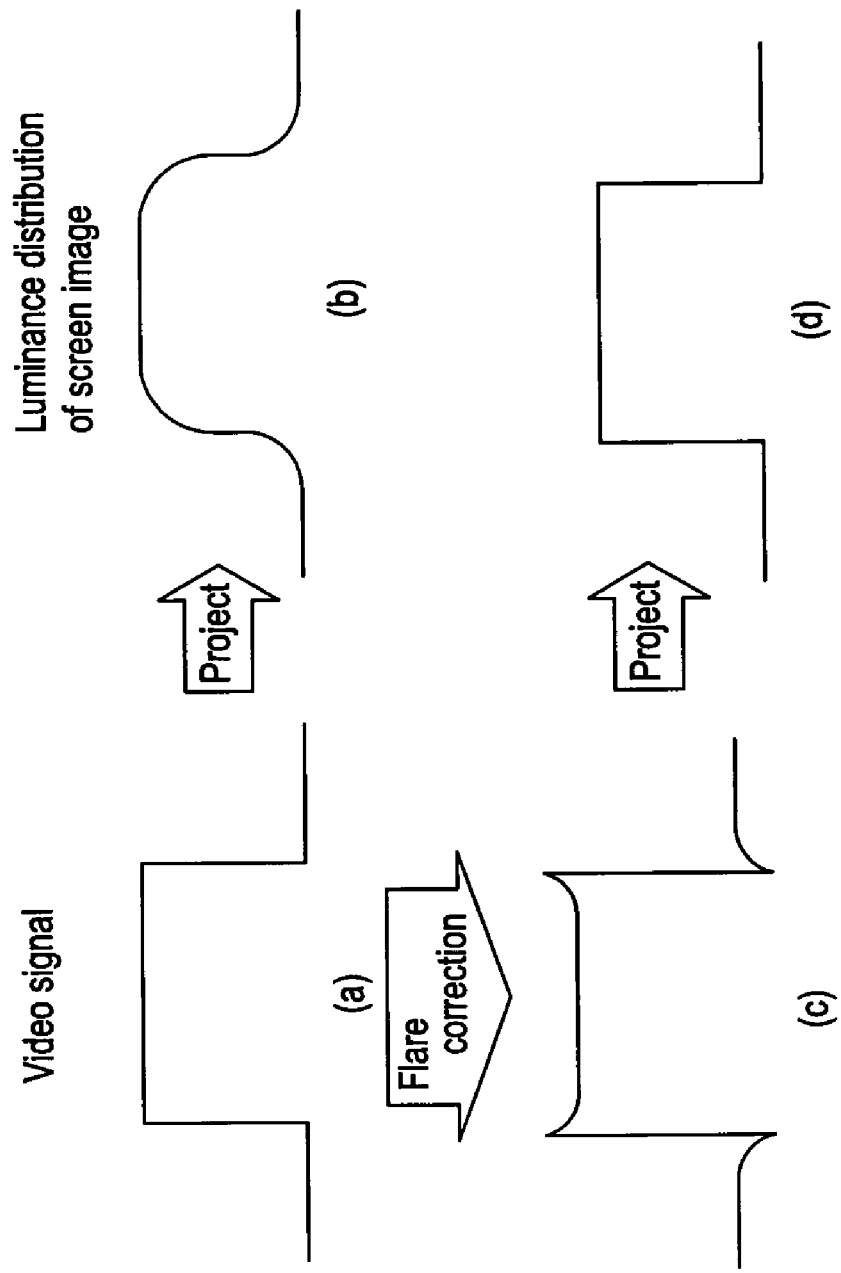
FIG. 2 is a schematic view of flare correction, (a) being a waveform chart showing the video signal of the original image; (b) being a luminance distribution chart of a screen image that is displayed by the video signal of (a); (c) being a waveform chart of the signal following flare correction of the video signal of (a); and (d) being a luminance distribution chart of the screen image that is displayed by the video signal following flare correction of (c).

The edge signal that is outputted from subtracter 2 is corrected by gain adjustment circuit 3 such that the gamma characteristic becomes linear, and then added to the original luminance signal that has been supplied from two-dimensional low-pass filter 1 by adder 4, whereby the signal waveform following flare correction that is shown in FIG. 2(c) is obtained. This luminance signal YOUT, which is the output of adder 6, and the color signal (broadband color signal and narrowband color signal) that is obtained from the primary color signals R-G-B are applied as input to a known matrix circuit (not shown in the figure) and reconverted to an R signal, a G signal, and a B signal, which are the primary color signals. Image display is realized based on the R signal, G signal, and B signal that have been reconverted in this way.

The most distinctive feature in the picture quality improvement device of the present embodiment that is described in the foregoing explanation is the constitution of two-dimensional low-pass filter 1. Referring to FIG. 7, a more specific explanation of two-dimensional low-pass filter 1 is next presented.

Two-dimensional low-pass filter 1 is made up by: vertical low-pass filter 11, vertical delay circuit 12, vertical gain adjustment circuit 13, horizontal low-pass filter 14, horizontal delay circuit 15, horizontal gain adjustment circuit 16, and delay circuit 17.

Luminance signal YIN that is obtained from the primary color signals R-G-B is supplied to each of vertical low-pass filter 11 and vertical delay circuit 12. Vertical low-pass filter 11 extracts the vertical low-pass component of the input luminance signal YIN, and this component is supplied to one of the inputs of vertical gain adjustment circuit 13. Vertical delay circuit 12 subjects the input luminance signal YIN to a delay of a time interval that is equivalent to the time required for filter processing in vertical low-pass filter 11, and supplies the result to the other input of vertical gain adjustment circuit 13 and to delay circuit 17. Vertical gain adjustment circuit 13 controls the gain of the vertical-direction low-pass component that is extracted by vertical low-pass filter 11.

The signal for which a vertical-direction low-pass component has been extracted by vertical low-pass filter 11 and for which gain has been controlled by vertical gain adjustment circuit 13 is supplied as a luminance signal to each of horizontal low-pass filter 14 and horizontal delay circuit 15. Horizontal low-pass filter 14 extracts the horizontal-direction low-pass component of the luminance signal that is supplied from vertical gain adjustment circuit 13 and supplies this signal to one of the inputs of horizontal gain adjustment circuit 16. Horizontal delay circuit 15 delays the luminance signal that is supplied from vertical gain adjustment circuit 13 by a time interval that is equivalent to the time required for filter processing in horizontal low-pass filter 14 and supplies the result to the other input of horizontal gain adjustment circuit 16. Horizontal gain adjustment circuit 16 controls the gain of the horizontal-direction low-pass component that has been extracted by horizontal low-pass filter 14. The signal that has undergone gain control by this horizontal gain adjustment circuit 16 is outputted as output signal LPF of two-dimensional low-pass filter 1.

Delay circuit 17 applies a delay of a time interval that is equivalent to the sum of time intervals required for the processing of each of vertical gain adjustment circuit 13, horizontal low-pass filter 14, and horizontal gain adjustment circuit 16 to a signal that has been obtained from vertical delay circuit 12 and that has been delayed a time interval that is equivalent to the time required for filter processing in vertical low-pass filter 11. The signal that has been delayed by this delay circuit 17 is outputted as output signal MAIN of two-dimensional low-pass filter 1.

In the two-dimensional low-pass filter 1 that is constituted as described above, the extraction gain of the vertical-direction low-pass component of an image is controlled by vertical gain adjustment circuit 13 and the extraction gain of the horizontal-direction low-pass component of an image is controlled by horizontal gain adjustment circuit 16.

Figure 4:
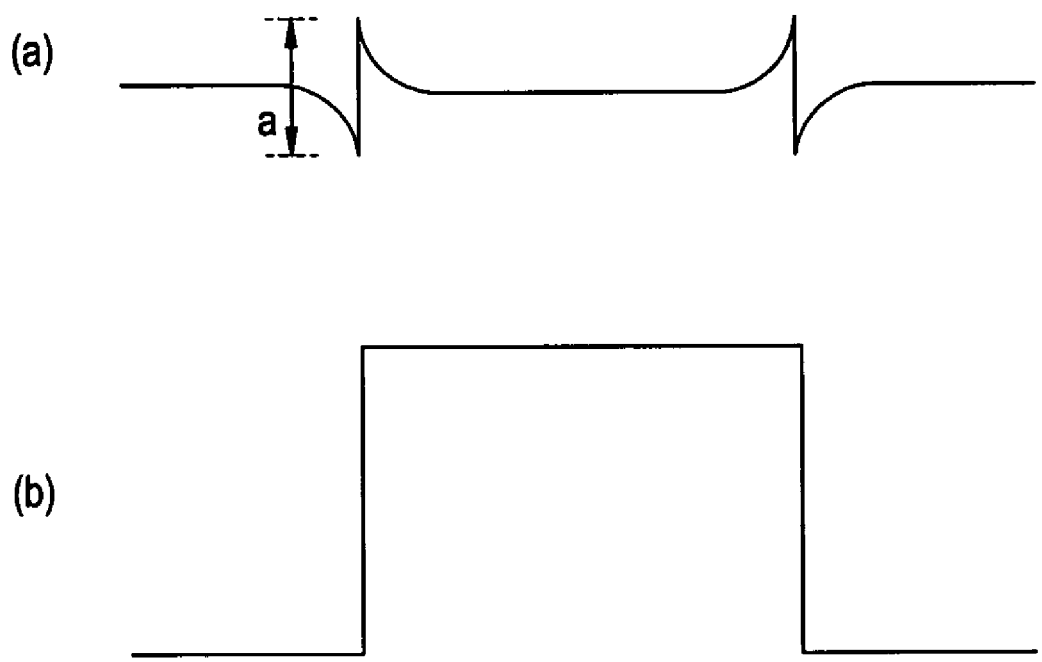
FIG. 4(a) is a waveform chart of an edge signal, and (b) is a waveform chart of the original video signal.
Figure 6:
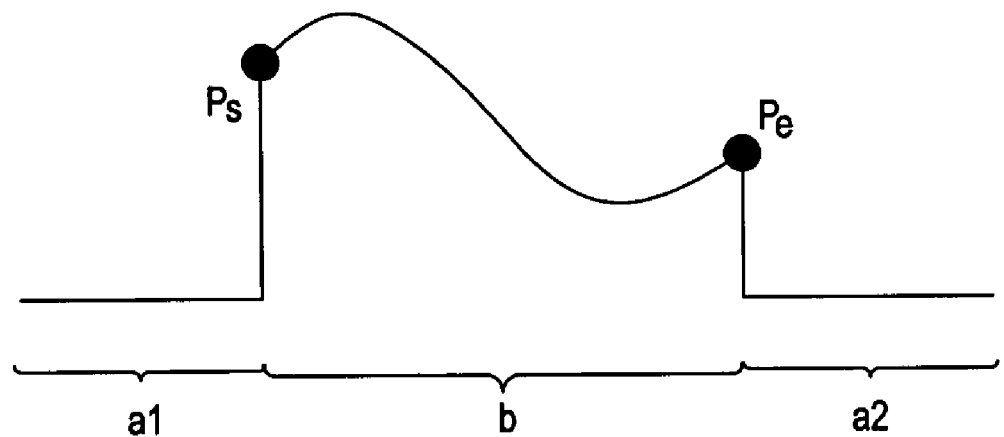
FIG. 6 is a waveform chart showing a video signal in the horizontal direction in normal display mode.

Independently controlling the extraction gain of the low-pass components in the vertical direction and horizontal direction in this way allows adjustment of the amount of the amplitude (the size of "a" in FIG. 4) of the edge signal according to the magnification of image enlargement when applying to the previously described wide screen. In such cases, there is no need to modify the setting of the response characteristics, i.e., the impulse response (filter coefficients), of vertical low-pass filter 11 and horizontal low-pass filter 14. If the filter coefficients are fixed, multipliers are not necessary and the low-pass filter circuits can be greatly reduced in size.

Figure 8:
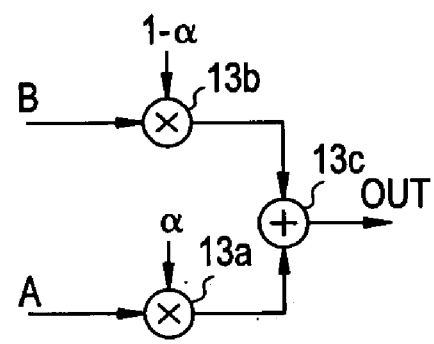
FIG. 8 is a schematic circuit diagram of the vertical gain adjustment circuit shown in FIG. 7.

Vertical gain adjustment circuit 13 and horizontal gain adjustment circuit 16 have the same constitution and can be realized using multipliers and adders. As one example, FIG. 8 shows a schematic circuit diagram of vertical gain adjustment circuit 13. This vertical gain adjustment circuit 13 includes: multiplier 13a that takes as input low-pass extraction signal A, which is the output of vertical low-pass filter 11; multiplier 13b that takes as input delay signal B, which is the output of vertical delay circuit 12; and adder 13c that adds the outputs of multiplier 13a and multiplier 13b.

Multiplier 13a applies gain control to received low-pass extraction signal A by means of an arbitrary gain $\alpha$. In other words, low-pass extraction signal A is multiplied by $\alpha$. On the other hand, multiplier 13b applies gain control to received delay signal B by means of gain $1-\alpha$ that has been obtained from gain $\alpha$ that has been set in multiplier 13a. In other words, delay signal B is multiplied by $1-\alpha$. In adder 13c, a low-pass extraction signal that has been multiplied by $\alpha$ is added to a delay signal B that has been multiplied by $1-\alpha$, whereby a signal is outputted in which the extraction gain of the low-pass component is controlled.

In vertical gain adjustment circuit 13 that is constituted as described above, setting the value of $\alpha$ to 1 results in the output of a signal from adder 13c that is the same as low-pass extraction signal A, and setting the value of $\alpha$ to 0 results in the output of a signal from adder 13c that is the same as delay signal B, i.e., a signal from which a low-pass component has not been extracted. Setting the value of $\alpha$ to between 1 and 0 results in the output from adder 13c of a signal in which the extraction gain of the low-pass component is multiplied by $\alpha$.

Specific examples of the changes in the edge portion of luminance signal YOUT that result from gain control by means of vertical gain adjustment circuit 13 are next described. Examples are here described in which $\alpha=1$ and $\alpha=0.5$.

(1) $\alpha=1$

Figure 9:
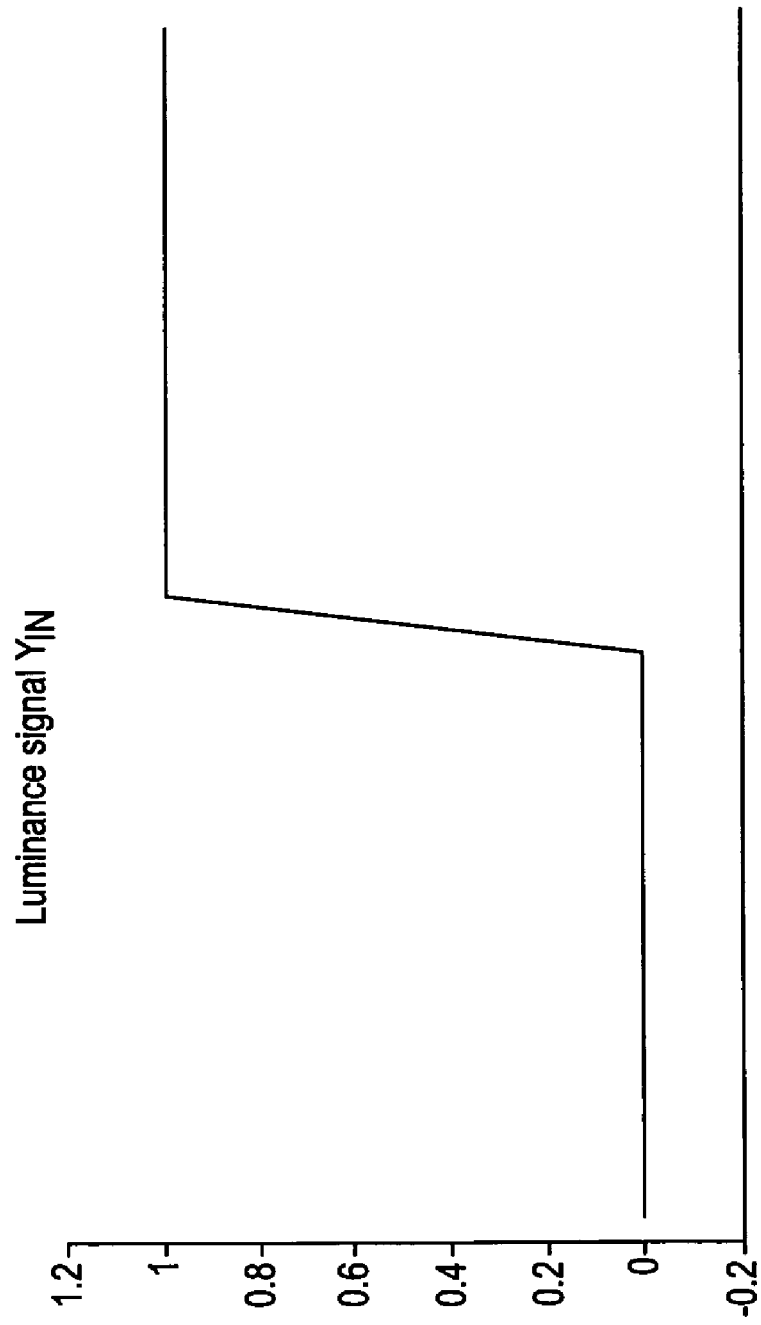
FIG. 9 is a waveform chart of luminance signal YIN that is applied as input to the vertical gain adjustment circuit shown in FIG. 7.
Figure 10:
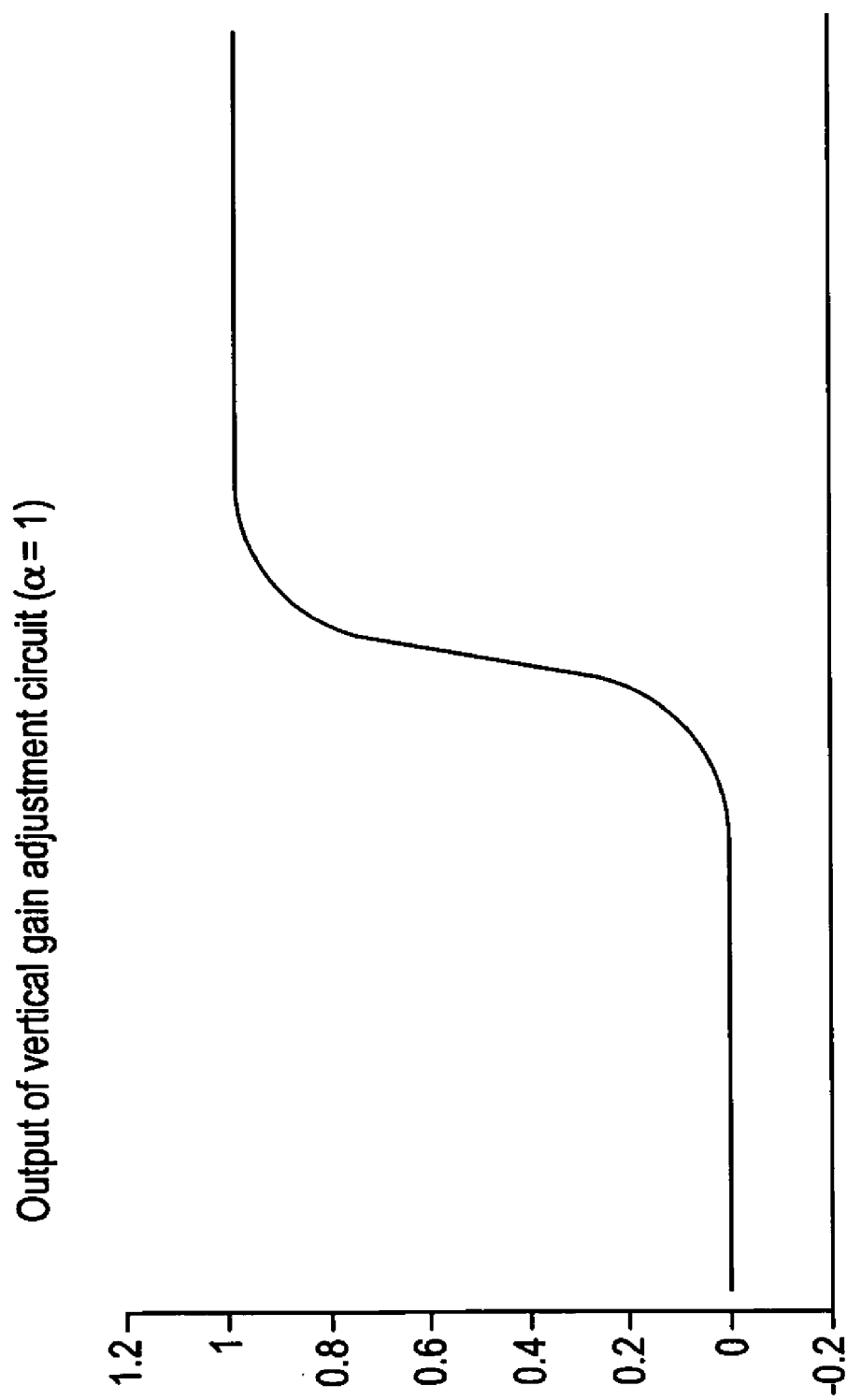
FIG. 10 is a waveform chart showing the output when value α of the vertical gain adjustment circuit shown in FIG. 7 is 1.

FIG. 9 is a waveform chart of luminance signal YIN that is applied as input to vertical gain adjustment circuit 13, and FIG. 10 is a waveform chart showing the output of vertical gain adjustment circuit 13 when $\alpha=1$. When luminance signal YIN having a sudden rise (edge portion) as shown in FIG. 9 is supplied to each of vertical delay circuit 12 and vertical low-pass filter 11, the low-frequency component of luminance signal YIN is extracted by vertical low-pass filter 11, and moreover, the gain of the extracted low-frequency component is regulated by vertical gain adjustment circuit 13. Since $\alpha=1$ in this case, the output of vertical low-pass filter 11 becomes the output of vertical gain adjustment circuit 13 without any modification, and, as shown in FIG. 10, the output waveform of vertical gain adjustment circuit 13 is a waveform in which the edge portions of luminance signal YIN of FIG. 9 are blunt.

Figure 11:
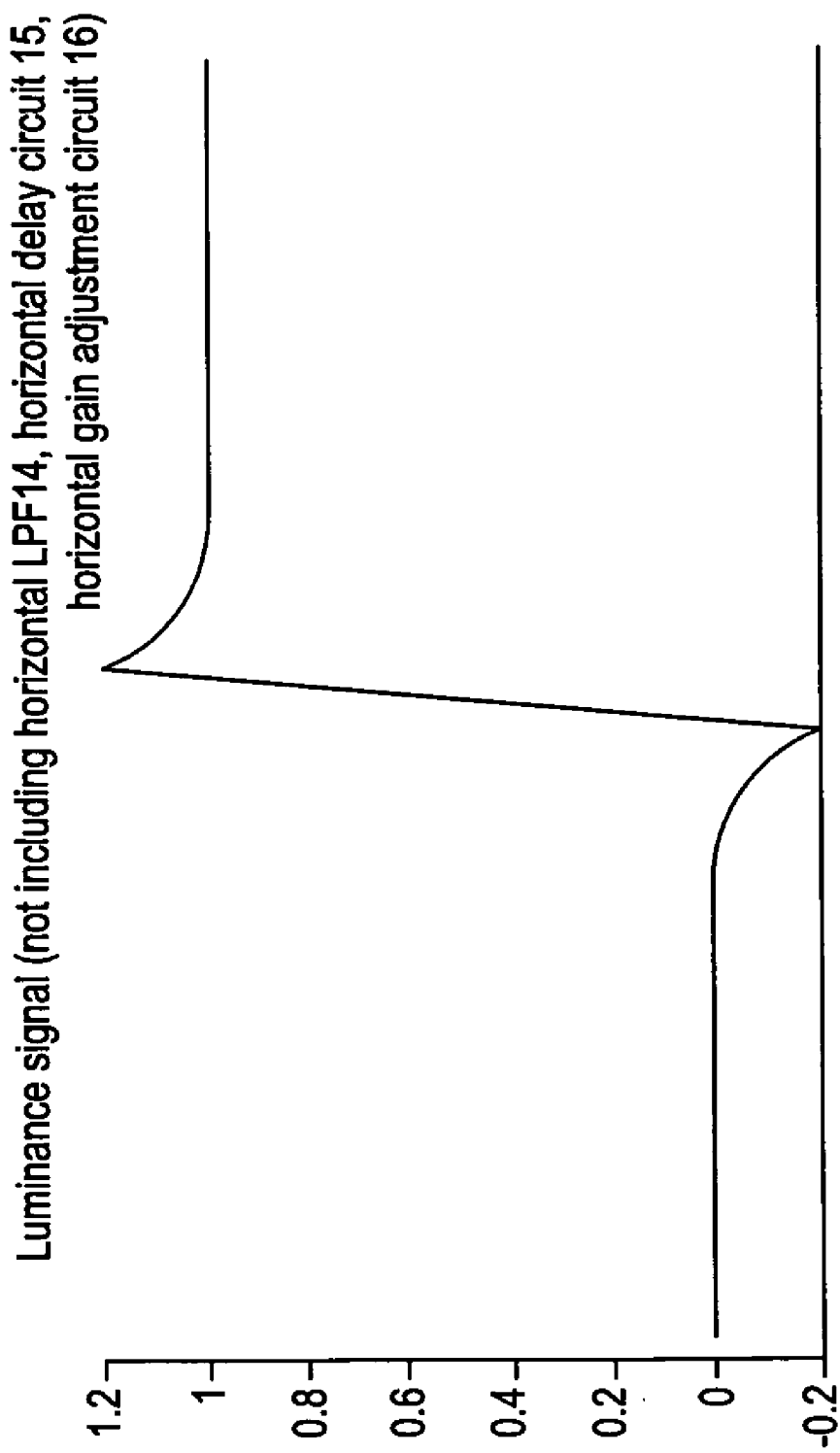
FIG. 11 is a waveform chart of luminance signal YOUT that is obtained by adding the edge signal, which is obtained by subtracting the output of vertical gain adjustment circuit shown in FIG. 10 from luminance signal YIN shown in FIG. 9, to the original luminance signal.

FIG. 11 is a waveform chart of luminance signal YOUT that is obtained by adding to the original luminance signal (the same as luminance signal YIN of FIG. 9) an edge signal that is obtained by subtracting the output of vertical gain adjustment circuit 13 of FIG. 10 from the luminance signal YIN of FIG. 9. This luminance signal YOUT has a signal waveform in which the edge portion of luminance signal YIN of FIG. 9 has been emphasized, whereby flare correction is realized.

During normal mode that is not applied to a wide screen, two-dimensional low-pass filter 1 is operated with $\alpha=1$.

(2) $\alpha=0.5$

When luminance signal YIN shown in FIG. 9 is supplied to each of vertical delay circuit 12 and vertical low-pass filter 11, the low-frequency component of luminance signal YIN is extracted by vertical low-pass filter 11, and further, the gain of the extracted low-frequency component is adjusted by vertical gain adjustment circuit 13. Since $\alpha=0.5$ in this case, the output of vertical gain adjustment circuit 13 is the extraction gain of the low-pass component resulting from vertical low-pass filter 11 multiplied by $\alpha(=0.5)$.

Figure 12:
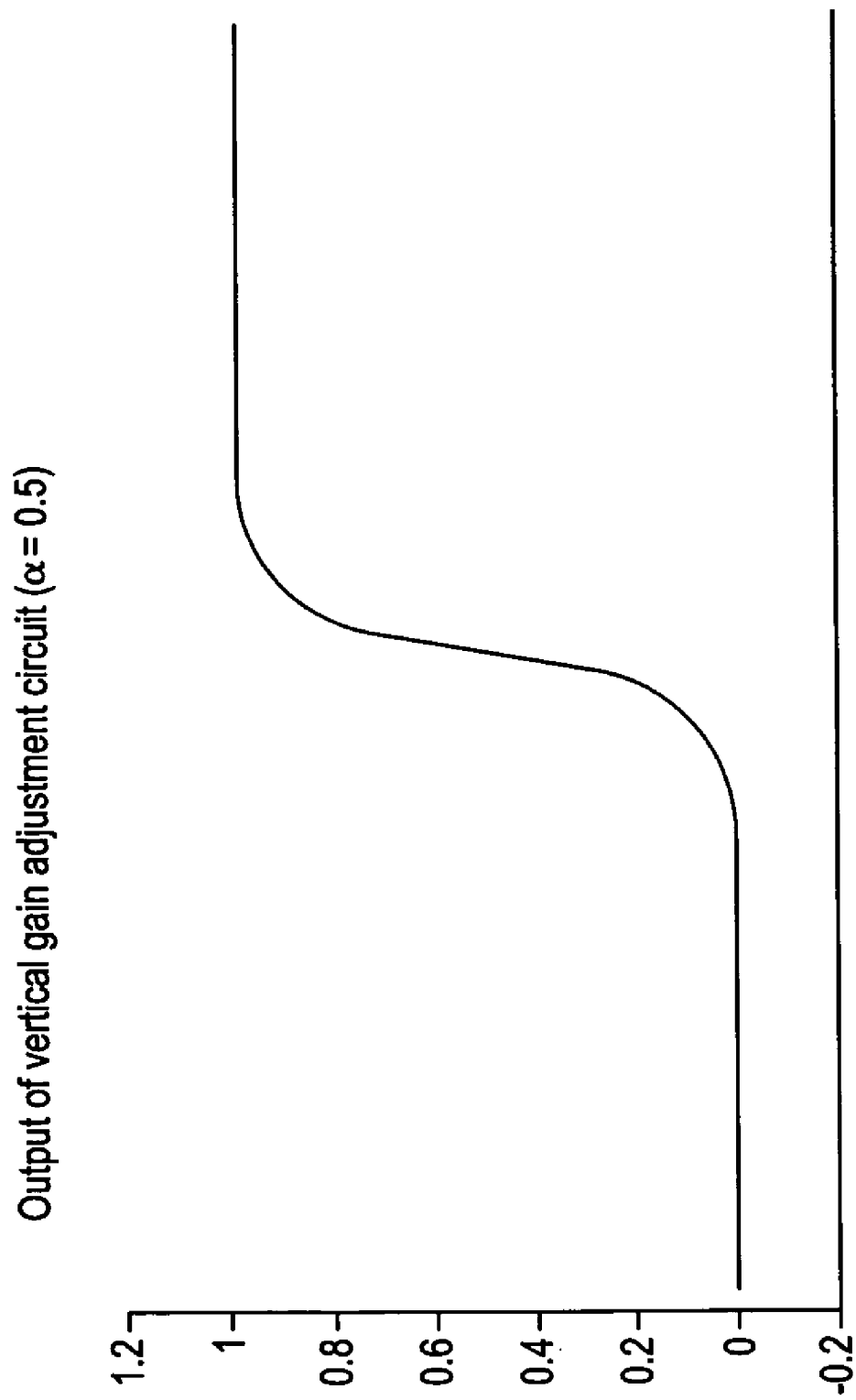
FIG. 12 is a waveform chart showing the output when the value α of the vertical gain adjustment circuit shown in FIG. 7 is 0.5.

FIG. 12 is a waveform chart showing the output of vertical gain adjustment circuit 13 when $\alpha=0.5$. When $\alpha=0.5$, the output waveform has edge portions that are slightly less blunted than the output waveform shown in FIG. 10. As a result, the amount of the amplitude (the size of "a" in FIG. 4) of the edge signal, which is the output of subtracter 2, is smaller than the above-described case in which $\alpha=1$.

Figure 13:
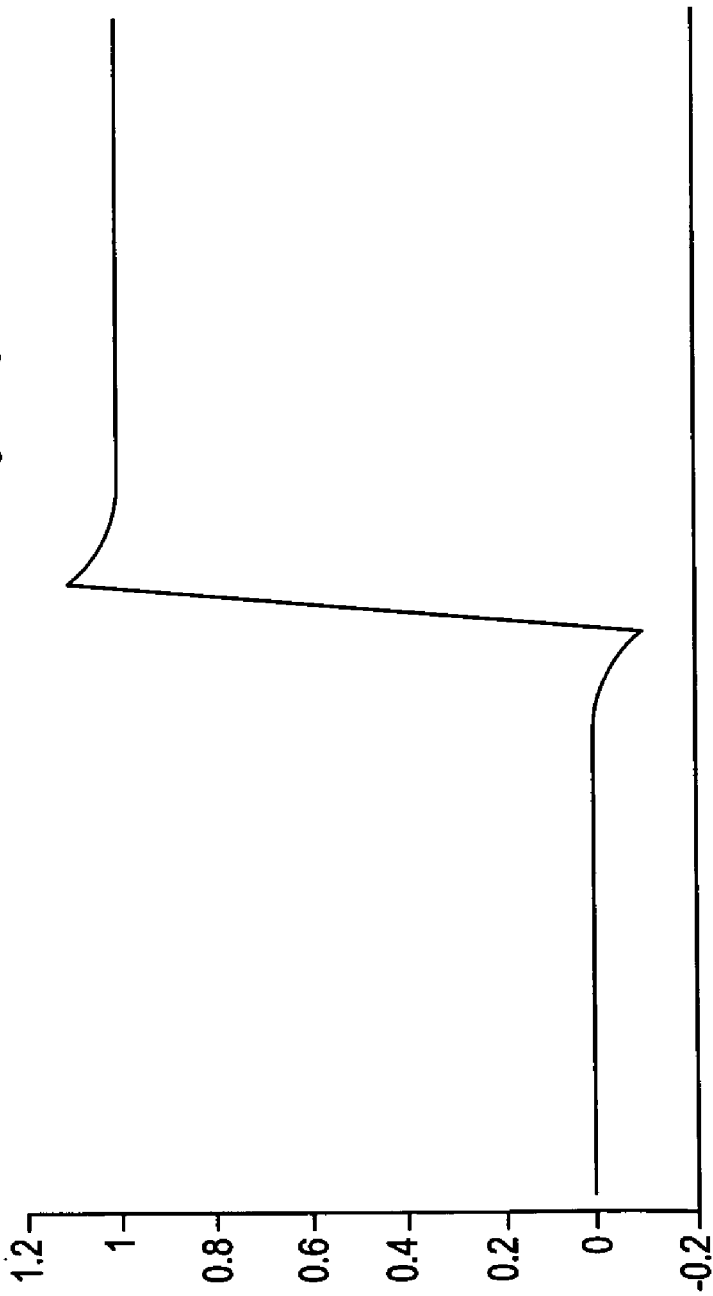
FIG. 13 is a waveform chart of luminance signal YOUT that is obtained by adding the edge signal, which is obtained by subtracting the output of the vertical gain adjustment circuit shown in FIG. 12 from luminance signal YIN shown in FIG. 9, to the original luminance signal.

FIG. 13 is a waveform chart of luminance signal YOUT that is obtained by adding to the original luminance signal an edge signal that is in turn obtained by subtracting the output of vertical gain adjustment circuit 13 of FIG. 12 from luminance signal YIN of FIG. 9.

This luminance signal YOUT is a signal waveform in which the edge portions of the luminance signal YIN of FIG. 9 have been emphasized, but the degree of emphasis of the edges is less than that of the luminance signal YOUT shown in FIG. 11 to the extent that the amplitude of the edge signal is decreased.

As can be understood from the foregoing explanation, setting the value of α to 1 in vertical gain adjustment circuit 13 and horizontal gain adjustment circuit 16 for application to a normal screen (having an aspect ratio of 4:3) and setting the value of α to a value between 0 and 1 depending on the magnification of enlargement of the video signal for application to a wide screen (having an aspect ratio of 16:9) enables realization of adequate flare correction and an excellent image for both normal screens and wide screens.

Explanation next relates to specific examples of the method of application to the previously described wide screen by means of vertical gain adjustment circuit 13 and horizontal gain adjustment circuit 16.

(1) Normal Display Mode

When set to normal display mode, the aspect ratio of the image that is displayed is 4:3, which is equal to the aspect ratio of the original image, and the extraction gain of the low-pass component of the vertical direction and horizontal direction should therefore be set to equal values.

(2) Full Display Mode

When set to full display mode, if flare correction is first realized by the circuit shown in FIG. 7 and the original image then enlarged in the horizontal direction at a prescribed magnification, the correction value itself will also be enlarged, with the result that the effect of sufficient flare correction, which is the object, cannot be obtained. In such a case, the extraction gain of the horizontal low-pass component should be decreased. In other words, the value of α of horizontal gain adjustment circuit 16 should be reduced. This approach enables a sufficient flare correction effect to be obtained without modifying the impulse response (filter coefficient) of horizontal low-pass filter 14.

(3) Zoom Display Mode

When set to zoom display mode, the effect upon correction resulting from image enlargement in the above-described full display mode also occurs in the vertical direction. In this case, the extraction gain of the vertical-direction low-pass component should be decreased. In other words, the value of α in vertical gain adjustment circuit 13 should be decreased. This approach enables a sufficient flare correction effect to be obtained without modifying the impulse response (filter coefficient) of vertical low-pass filter 11.

(4) Nonlinear Display Mode

When set to nonlinear display mode, the enlargement of the image is nonlinear, and the effect upon flare correction caused by enlargement of the image is therefore also nonlinear. In this case, the extraction gain of the low-pass component (the value of α in the vertical gain adjustment circuit 13 and horizontal gain adjustment circuit 16) should be modified as appropriate according to the enlargement of the image, which corresponds to the position of display of the image. Of course, the nonlinear processing circuit for realizing nonlinear display mode may be provided on the input side of the circuit shown in FIG. 7 as in the prior art.

In the interest of simplifying the LPF circuits, vertical delay circuit 12 and horizontal delay circuit 17 in the above-described embodiment may share a portion of the circuits that constitute vertical low-pass filter 11 and horizontal low-pass filter 14.

Figure 14:
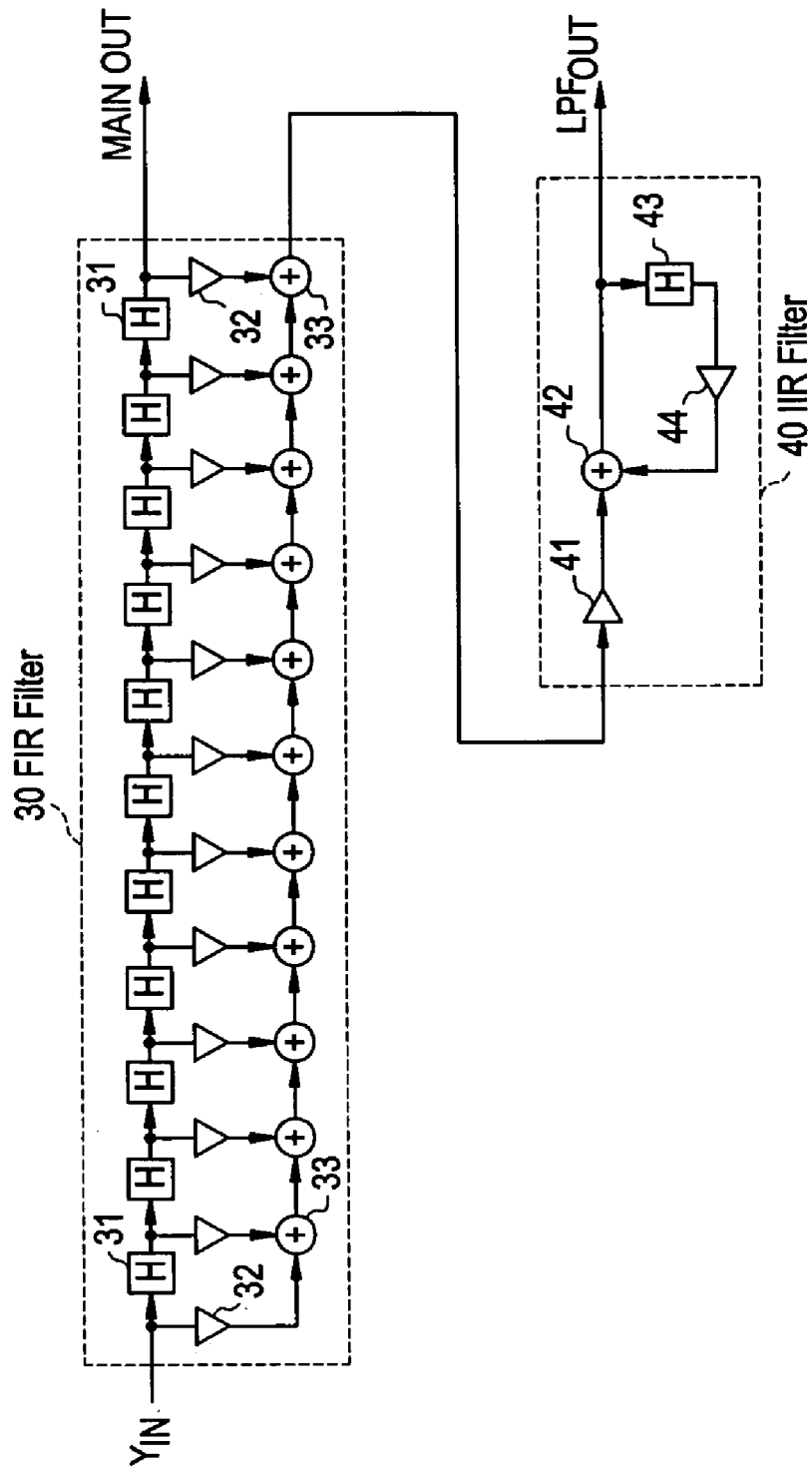
FIG. 14 is a circuit diagram showing an example of the constitution of the vertical low-pass filter shown in FIG. 7.

FIG. 14 is a circuit diagram showing an example of the constitution of vertical low-pass filter 11 shown in FIG. 7. This vertical low-pass filter is a device in which 12-Tap FIR filter 30 and 1-Tap IIR filter 40 are in cascade connection.

FIR filter 30 is composed of: eleven cascade-connected delay elements (line memory) 31 to which input signal IN is applied as input; 12 coefficient units 32 that take as input the input signal IN and the output of each delay element 31; and eleven adders 33 for adding respective outputs of these coefficient units 32; the output of adders 33 being the output of this FIR filter 30.

IIR filter 40 is made up by: two coefficient units 41 and 44; adder 42; and delay element 43, which is a line memory. Coefficient unit 41 takes as input the output of FIR filter 30 and supplies its output to one input of adder 42. The output of adder 42 is split into two branches, one branch being the output OUT of vertical low-pass filter 11 and the other branch being supplied to delay element 43. The output of delay element 43 is supplied to the other input of adder 42 by way of coefficient unit 44.

Output M from the eleventh delay element is equivalent to a signal that is delayed by a time interval that is equal to the time required for filter processing in vertical low-pass filter 11. Accordingly, the use of output M from the eleventh delay element as the output of vertical delay unit 12 eliminates the need for vertical delay unit 12.

Figure 15:
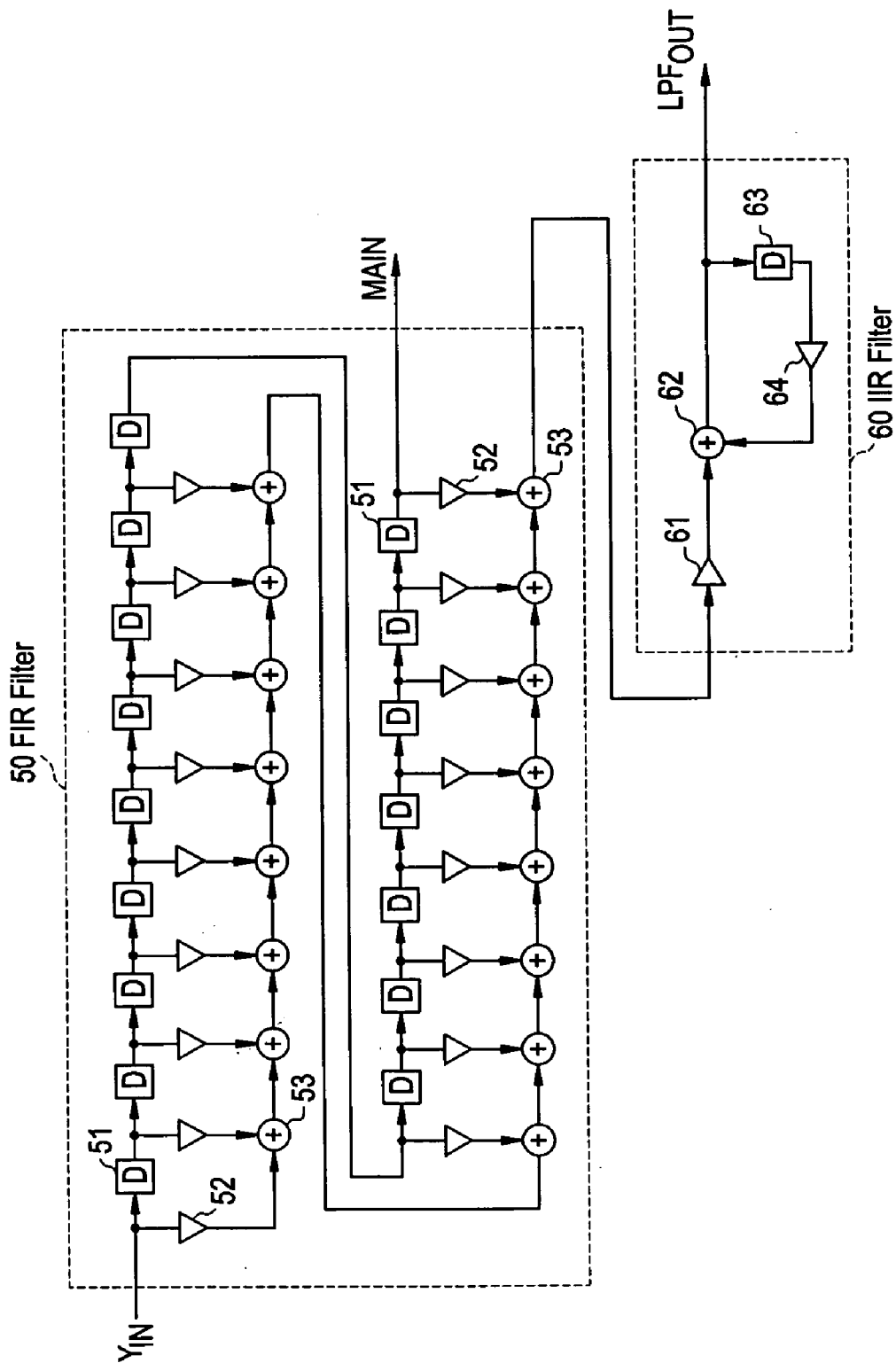
FIG. 15 is a circuit diagram showing an example of the constitution of the horizontal low-pass filter shown in FIG. 7.

FIG. 15 is a circuit diagram showing an example of the constitution of horizontal low-pass filter 14 shown in FIG. 7. This horizontal low-pass filter 14 is a component in which 17-Tap FIR filter 50 and 1-Tap IIR filter 60 are cascade connected.

FIR filter 50 is made up by: 16 delay elements (registers) 51 in cascade connection that take input signal IN as input; 17 coefficient units 52 that take the input signal IN and the output of each delay element 51 as input; and 16 adders 53 that add respective outputs of these coefficient units 52; the output of adders 53 being the output of this FIR filter 50.

IRR filter 60 is made up by: two coefficient units 61 and 64; adder 62, and delay element 63. Coefficient unit 61 takes as input the output of FIR filter 50 and supplies its output to one input of adder 62. The output of adder 62 is branched, one branch becoming the output OUT of horizontal low-pass filter 14 and the other branch being supplied to delay element 63. The output of delay element 63 is supplied to the other input of adder 62 by way of coefficient unit 64.

The output M of the sixteenth delay element is equivalent to a signal that has been delayed by a time interval equal to the time required for filter processing in horizontal low-pass filter 14, and accordingly, using the output M from the sixteenth delay element as the output of horizontal delay unit 15 eliminates the need for horizontal delay unit 15.

As with the previously described picture quality improvement device of the prior art that employed components for the vertical low-pass filter and horizontal low-pass filter that allowed change of the filter coefficients, the picture quality improvement device of the present embodiment that is described hereinabove is capable of obtaining a sufficient picture quality improvement effect in a wide screen display in which an image is extended in the horizontal and vertical directions.

Further, the present embodiment allows the value of α to be set in the vertical gain adjustment circuit and horizontal gain adjustment circuit according to the enlargement of an image in a wide screen display but can also be applied to the enlargement of an image for other reasons. Specifically, the present embodiment can be applied when dealing with differences in the number of scanning lines according to the signal system (such as NTSC (National Television System Committee) system and PAL (Phase alternating by line) system) or for similar picture quality correction for video signals of computers in which various display resolutions exist.

While a preferred embodiment of the present invention has been described using specific terms, such description is for illustrative purposes only, and it is to be understood that changes and variations may be made without departing from the spirit or scope of the following claims.

What is claimed is:

1. A picture quality improvement device,
    said device having a two-dimensional low-pass filter for taking as input a luminance signal that is obtained from a video signal and extracting low-pass components of said input luminance signal for a vertical direction and a horizontal direction of an image that is displayed by means of said video signal; and
    said device adding an edge signal, which is obtained by subtracting said low-pass components that are extracted by said two-dimensional low-pass filter from said luminance signal, to said luminance signal;
    wherein said two-dimensional low-pass filter is constituted such that extracted gain of the low-pass component of the vertical direction and the extracted gain of the low-pass component of the horizontal direction can be individually adjusted according to a magnification of enlargement of said image; and
    wherein said two-dimensional low-pass filter comprises:
    a vertical low-pass filter for extracting a low-pass component of the vertical direction of an input luminance signal;
    a vertical delay unit for receiving as input said input luminance signal that has been branched and delaying said input luminance signal that has been branched and received by a prescribed delay time interval;
    a vertical gain adjustment means for obtaining, from the low-pass component of the vertical direction that has been extracted by said vertical low-pass filter and a delayed luminance signal that has been delayed by said vertical delay unit, a vertical low-pass component that has undergone gain adjustment to become a prescribed gain;
    a horizontal low-pass filter for receiving as input a luminance signal that is outputted from said vertical gain adjustment means and from which said vertical low-pass component has been extracted and extracting a low-pass component of the horizontal direction of said input luminance signal;
    a horizontal delay unit for receiving as input the luminance signal that is outputted from said vertical gain adjustment means and branched and delaying the input luminance signal that has been branched and received by a prescribed delay time interval; and
    a horizontal gain adjustment means for obtaining, from the low-pass component of the horizontal direction that has been extracted by said horizontal low-pass filter and a delayed luminance signal that has been delayed by said horizontal delay unit, a horizontal low-pass component that has undergone gain adjustment to become a prescribed gain.

2. A picture quality improvement device according to claim 1, wherein filter response characteristics of said vertical low-pass filter and said horizontal low-pass filter are fixed.

3. A picture quality improvement device according to claim 2, wherein each of said vertical gain adjustment means and said horizontal gain adjustment means comprises:
    a first multiplier for multiplying the low-pass component that has been extracted by said low-pass filter by $\alpha$;
    a second multiplier for multiplying a delayed luminance signal by $(1-\alpha)$; and
    an adder for adding outputs of said first and second multipliers;
    wherein a value of $\alpha$ is set between 0 and 1.

4. A picture quality improvement device according to claim 1, wherein each of said vertical gain adjustment means and said horizontal gain adjustment means comprises:
    a first multiplier for multiplying an input luminance signal by $\alpha$;
    a second multiplier for multiplying the low-pass component that has been extracted by said low-pass filter by $(1-\alpha)$; and
    an adder for adding outputs of said first and second multipliers;
    wherein a value of $\alpha$ is set between 0 and 1.

5. A picture quality improvement device according to claim 1, wherein delay elements that constitute said vertical delay unit are common to delay elements that constitute said vertical low-pass filter.

6. A picture quality improvement device according to claim 1, wherein delay elements that constitute said horizontal delay unit are common to delay elements that constitute said horizontal low-pass filter.

7. A picture quality improvement device comprising:
    a two-dimensional low-pass filter for taking as input a luminance signal that is obtained from a video signal and extracting low-pass components of said input luminance signal for a vertical direction and a horizontal direction of an image that is displayed by means of said video signal and wherein the gain of the extracted low-pass component of the vertical direction and the gain of the extracted low-pass component of the horizontal direction are independently adjusted, said two-dimensional low-pass filter comprising:
    a vertical low-pass filter for extracting a low-pass component of the vertical direction of an input luminance signal;
    a vertical delay unit for receiving as input said input luminance signal that has been branched and delaying said input luminance signal that has been branched and received by a prescribed delay time interval;
    a vertical gain adjustment means for obtaining, from the low-pass component of the vertical direction that has been extracted by said vertical low-pass filter and a delayed luminance signal that has been delayed by said vertical delay unit, a vertical low-pass component that has undergone gain adjustment to become a prescribed gain;
    a horizontal low-pass filter for receiving as input a luminance signal that is outputted from said vertical gain adjustment means and from which said vertical low-pass component has been extracted and extracting a low-pass component of the horizontal direction of said input luminance signal;
    a horizontal delay unit for receiving as input the luminance signal that is outputted from said vertical gain adjustment means and branched and delaying the input luminance signal that has been branched and received by a prescribed delay time interval; and
    a horizontal gain adjustment means for obtaining, from the low-pass component of the horizontal direction that has been extracted by said horizontal low-pass filter and a delayed luminance signal that has been delayed by said horizontal delay unit, a horizontal low-pass component that has undergone gain adjustment to become a prescribed gain; and
    said device adding an edge signal, which is obtained by subtracting said low-pass components that are extracted by said two-dimensional low-pass filter from said luminance signal, to said luminance signal.

8. A picture quality improvement device according to claim 7, wherein filter response characteristics of said vertical low-pass filter and said horizontal low-pass filter are fixed.

9. A picture quality improvement device according to claim 7, wherein each of said vertical gain adjustment means and said horizontal gain adjustment means comprises:
   a first multiplier for multiplying an input luminance signal by $\alpha$;
   a second multiplier for multiplying a delayed luminance signal by $(1-\alpha)$; and
   an adder for adding outputs of said first and second multipliers;
   wherein a value of $\alpha$ is set between 0 and 1.

10. A picture quality improvement device according to claim 8, wherein each of said vertical gain adjustment means and said horizontal gain adjustment means comprises:
    a first multiplier for multiplying an input luminance signal by $\alpha$;
    a second multiplier for multiplying a delayed luminance signal by $(1-\alpha)$; and
    an adder for adding outputs of said first and second multipliers;
    wherein a value of $\alpha$ is set between 0 and 1.

11. A picture quality improvement device according to claim 7, wherein delay elements that constitute said vertical delay unit are common to delay elements that constitute said vertical low-pass filter.

12. A picture quality improvement device according to claim 7, wherein delay elements that constitute said horizontal delay unit are common to delay elements that constitute said horizontal low-pass filter.

13. A picture quality improvement method, comprising:
    a first step for extracting low-pass components of a luminance signal that is obtained from a video signal for each of a vertical direction and a horizontal direction of an image that is displayed by means of said video signal thereby obtaining a low-pass extraction signal;
    a second step for subtracting said low-pass extraction signal that was extracted in said first step from said luminance signal to obtain an edge signal and adding the obtained edge signal to said luminance signal; and
    a third step for controlling individually extracted gain of the low-pass component of the vertical direction and extracted gain of the low-pass component of the horizontal direction according to a magnification of enlargement of said image,
    wherein said third step comprises:
    a step for obtaining a vertical low-pass component that has undergone gain adjustment to become a prescribed gain, from the extracted low-pass component of the vertical direction from said luminance signal and a first delayed luminance signal in which said luminance signal has been delayed by a prescribed delay time interval; and
    a step for receiving as input a luminance signal from which said vertical low-pass component has been extracted; extracting a low-pass component of the horizontal direction of the input luminance signal; and obtaining, from the extracted horizontal direction low-pass component and a second delayed luminance signal in which said input luminance signal has been delayed by a prescribed delay time interval, a horizontal low-pass component that has undergone gain adjustment to become a prescribed gain.

14. A picture quality improvement method, comprising:
    a first step for extracting low-pass components of a luminance signal that is obtained from a video signal for each of a vertical direction and a horizontal direction of an image that is displayed by means of said video signal; and
    a second step for subtracting a low-pass extraction signal that was extracted in said first step from said luminance signal to obtain an edge signal and adding the obtained edge signal to said luminance signal;
    wherein extracted gain of the low-pass component of the vertical direction and extraction gain of the low-pass component of the horizontal direction in said first step are independently adjusted; and
    wherein said first step comprises:
    a step for extracting a low-pass component of the vertical direction of a luminance signal, and obtaining, from the extracted low-pass component of the vertical direction and a first delayed luminance signal in which said luminance signal has been delayed by a prescribed delay time interval, a vertical low-pass component that has undergone gain adjustment to become a prescribed gain; and
    a step for receiving as input a luminance signal from which said vertical low-pass component has been extracted; extracting a low-pass component of the horizontal direction of the input luminance signal; and obtaining, from the extracted horizontal direction low-pass component and a second delayed luminance signal in which said input luminance signal has been delayed by a prescribed delay time interval, a horizontal low-pass component that has undergone gain adjustment to become a prescribed gain.

* * * * *